(12) United States Patent
Puchini

(10) Patent No.: US 11,618,390 B2
(45) Date of Patent: Apr. 4, 2023

(54) ROTATABLE CAMERA MOUNT

(71) Applicant: Swivel Mount LLC, Plantsville, CT (US)

(72) Inventor: Troy Carl Puchini, Plantsville, CT (US)

(73) Assignee: Swivel Mount LLC, Plantsville, CT (US)

( * ) Notice: Subject to any disclaimer, the term of this patent is extended or adjusted under 35 U.S.C. 154(b) by 56 days.

(21) Appl. No.: 16/993,666

(22) Filed: Aug. 14, 2020

(65) Prior Publication Data
US 2022/0048442 A1 Feb. 17, 2022

(51) Int. Cl.
| | |
|---|---|
| B60R 11/04 | (2006.01) |
| F16M 13/02 | (2006.01) |
| H04N 23/54 | (2023.01) |
| H04N 23/695 | (2023.01) |
| B60R 11/00 | (2006.01) |

(52) U.S. Cl.
CPC ........... B60R 11/04 (2013.01); F16M 13/022 (2013.01); H04N 23/54 (2023.01); H04N 23/695 (2023.01); *B60R 2011/004* (2013.01); *B60R 2011/0057* (2013.01); *B60R 2011/0085* (2013.01)

(58) Field of Classification Search
CPC ............... B60R 11/04; B60R 2011/004; B60R 2011/0057; B60R 2011/0085; F16M 13/022; H04N 5/2253; H04N 5/23299
See application file for complete search history.

(56) References Cited

U.S. PATENT DOCUMENTS

| | | | |
|---|---|---|---|
| 6,322,258 B1 * | 11/2001 | Ryan | G08B 13/196 |
| | | | 396/433 |
| 8,831,415 B2 | 9/2014 | Greenthal | |
| 2014/0016922 A1 * | 1/2014 | Greenthal | G03B 17/56 |
| | | | 396/419 |
| 2020/0109813 A1 * | 4/2020 | Geerds | F16B 47/00 |
| 2021/0156509 A1 * | 5/2021 | Liao | F16M 11/18 |

OTHER PUBLICATIONS

Instagram post from username: slide_united_motorsports, Jun. 11, 2020, https://www.instagram.com/p/CBSuACCn5w5/?igshid=vjmhxzy7e1fo.
Slide United Motorsports, product catalog for 360 Degree Action Camera Vector Mount, https://slideunitedmotorsports.bigcartel.com/product/360-degree-action-camera-vector-mount.

* cited by examiner

*Primary Examiner* — Nasim N Nirjhar
(74) *Attorney, Agent, or Firm* — Carmody Torrance Sandak & Hennessey LLP

(57) ABSTRACT

The present disclosure is directed to a rotatable camera mount capable of capturing images/video in one or more directions. The rotatable camera mount may be capable of capturing images/video in a direction in which an object (e.g., vehicle) is traveling. The rotatable camera mount may be capable of being rotated in a direction of airflow traveling across the camera mount. The rotatable camera mount may be capable of being directly/indirectly engaged with a mounting base.

9 Claims, 11 Drawing Sheets

ROTATABLE CAMERA MOUNT

FIELD OF THE INVENTION

The present invention generally relates to a rotatable camera mount capable of capturing images/video in one or more directions.

BACKGROUND OF THE INVENTION

Traditional systems/methods for positioning a camera onto a moving object are either overly complicated, such that a user cannot easily setup and adjust the movability of the camera, or the camera is rigidly mounted to the moving object, such that it limits the field of view of the camera to the direction in which the camera is initially positioned.

For example, U.S. Pat. No. 8,831,415 to Greenthal is directed to a rotating camera mount with a counterweight for mounting on a vehicle. Greenthal describes a swing-weight assembly to counteract forces on a camera coupled to a mounting flange when the vehicle encounters a turn to direct the camera into the turn. Depending on the location/number of cameras, the swing-weight assembly can be adjusted to compensate for the cameras and position the center of mass of a rotating mount relative to the axis of rotation. Greenthal states that the further the center of mass is from the axis of rotation, the greater the centrifugal forces and the greater the degree of swinging or rotation of the camera as the vehicle turns. Thus, a user must go through the arduous task of trial and error to determine the balanced position of the swing-weight assembly to ensure that the degree of swinging or rotation of the camera while a vehicle turns is satisfactory for capturing images/video.

Moreover, a static camera mount only captures images/video in the direction in which the camera is initially positioned. For example, as shown in FIG. 1 (Prior Art), a static camera mount 2 is positioned on a vehicle 1 to capture images/video of the direction in which the camera is facing 3 (i.e., the front end of the vehicle 1). In instances where the vehicle is traveling in a "straight" direction, the camera will capture images/video of the direction in which the vehicle is traveling. However, in instances where the vehicle is traveling in a direction different than the direction in which the camera is pointing (e.g., vehicle turning or drifting), then the camera cannot capture images/video of the direction the vehicle is traveling.

Based on the foregoing, there is a need in the art for an improved system and method for capturing images/video of the direction in which an object is traveling (or has traveled).

SUMMARY OF THE INVENTION

It is an object of the present invention to provide a camera mount for use in stationary and/or movable applications. It is another object of the present invention to provide a rotatable camera mount capable of capturing images/video in one or more directions. Particularly, it is an object of the present invention to provide a rotatable camera mount capable of capturing images/video in a direction in which an object is traveling (or has traveled).

In an exemplary embodiment, a rotatable camera mount assembly includes a body defining a first surface, a second surface, and at least one sidewall extending therebetween; a body attachment component, wherein the body attachment component defines a first surface, a second surface and at least one sidewall extending therebetween. The body is mounted with respect to the body attachment component by a shaft. The shaft extends at least between the second surface of the body and the first surface of the body attachment component, thereby defining an axis of rotation extending between the body and the body attachment component, such that the body is capable of being rotated with respect to the body attachment component. The body defines at least one camera attachment feature capable of being engaged with at least one recording device.

The rotatable camera mount assembly also includes a wind vane assembly including a pole and a flag, wherein the pole defines a first end and a second end, wherein the first end of the pole is mounted with respect to the first surface of the body and the pole extends in a direction opposite the second surface of the body. The pole is angled in a direction opposite the axis of rotation, such that the second end of the pole is further from the axis of rotation than the first end of the pole. The flag is mounted in close proximity with respect to the second end of the pole and the flag defines two angled portions tangentially positioned relative to the pole. The body and the wind vane assembly are capable of being rotated in a direction of airflow traveling across the body and the wind vane assembly.

In some embodiments, the rotatable camera mount assembly is capable of being mounted with respect to a mounting base. Particularly, the body attachment component is capable of being mounted with respect to a mounting base.

The rotatable camera mount assembly further includes a spring mechanism mounted with respect to the shaft between the body and the body attachment component. The body and the body attachment component are capable of at least partially compressing the spring mechanism.

The at least one camera attachment feature is configured such that a field of view of the at least one recording device is positioned in a direction opposite the direction of the airflow. In some embodiments, the body defines two camera attachment features that are capable of being engaged with two recording devices. A first of the two camera attachment features is configured such that a field of view of the first recording device is positioned in a direction at least substantially opposite the direction of the airflow and a second of the two camera attachment features is configured such that a field of view of the second recording device is positioned in a direction at least substantially with the direction of the airflow.

In some embodiments, the two angled portions of the flag define an internal angle range between about 25 degrees and about 35 degrees. In some embodiments, the flag is fabricated from a single piece of material and curved over the pole to define the two angled portions.

In some embodiments, the pole defines an angle range between about 105 degrees and about 115 degrees relative to the axis of rotation.

In another exemplary embodiment, a mounting base assembly includes a mounting base body defining at least two mounting features, wherein the mounting base body defines a first surface, a second surface, and at least one sidewall. The first surface of the mounting base body defines an attachment mechanism capable of being engaged with a rotatable camera mount assembly and the second surface of the mounting base body defines a surface curvature of a first radius. At least one engagement element is mounted with respect to each mounting feature, wherein each mounting feature is capable of being directly/indirectly engaged with a surface of an object.

In some embodiments, the mounting base body defines a three-pointed star configuration, wherein each point is at least one mounting feature. In some embodiments, the at least one engagement element is positioned within a cavity of the mounting feature such that at least a portion of the at least one engagement element does not engage with the surface of the object. In some embodiments, the at least one engagement element is a magnet.

In another exemplary embodiment, a rotatable camera and base mount assembly includes a rotatable camera mount assembly including a camera mount body defining a first surface, a second surface, and at least one sidewall extending therebetween; and a camera mount body attachment component, wherein the camera mount body attachment component defines a first surface, a second surface and at least one sidewall extending therebetween. The camera mount body is mounted with respect to the camera mount body attachment component by a shaft, the shaft extending at least between the second surface of the camera mount body and the first surface of the camera mount body attachment component, thereby defining an axis of rotation extending between the camera mount body and the camera mount body attachment component, such that the camera mount body is capable of being rotated with respect to the camera mount body attachment component. The camera mount body attachment component defines an attachment mechanism capable of being engaged with a mounting base assembly.

The rotatable camera and base mount assembly further includes a wind vane assembly including a pole and a flag, wherein the pole defines a first end and a second end, wherein the first end of the pole is mounted with respect to the first surface of the camera mount body and the pole extends in a direction opposite the second surface of the camera mount body. The pole is angled in a direction opposite the axis of rotation, such that the second end of the pole is further from the axis of rotation than the first end of the pole. The flag is mounted in close proximity with respect to the second end of the pole and the flag defines two angled portions tangentially positioned relative to the pole.

The rotatable camera and base mount assembly further includes a mounting base assembly including a mounting base body defining at least two mounting features, wherein the mounting base body defines a first surface, a second surface, and at least one sidewall. The first surface of the mounting base body defines a corresponding attachment mechanism capable of being engaged with the attachment mechanism of the rotatable camera mount assembly. At least one engagement element is mounted with respect to each mounting feature, wherein each mounting feature is capable of being directly/indirectly engaged with a surface of an object.

The camera mount body of the rotatable camera and base mount assembly defines at least one camera attachment feature capable of being engaged with at least one recording device. The camera mount body and the wind vane assembly are capable of being rotated in a direction of an airflow traveling across the camera mount body and the wind vane assembly.

In some embodiments, the second surface of the mounting base body defines a surface curvature of a first radius. In some embodiments, the mounting base body defines a three-pointed star configuration, wherein each point is at least one mounting feature. In some embodiments, the rotatable camera mount assembly is capable of being tilted relative to the mounting base assembly.

In some embodiments, the at least one camera attachment feature is configured such that a field of view of the at least one recording device is positioned in a direction opposite the direction of the airflow.

In some embodiments, the body defines two camera attachment features and is capable of being engaged with two recording devices; wherein a first of the two camera attachment features is configured such that a field of view of the first recording device is positioned in a direction at least substantially opposite the direction of the airflow and a second of the two camera attachment features is configured such that a field of view of the second recording device is positioned in a direction at least substantially with the direction of the airflow.

Any combination or permutation of features, functions and/or embodiments as disclosed herein is envisioned. Additional advantageous features, functions and applications of the disclosed systems and methods of the present invention will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale, and in certain views, parts may have been exaggerated or removed for purposes of clarity.

Exemplary embodiments of the present invention are further described with reference to the appended figures. It is to be noted that the various features, steps and combinations of features/steps described below and illustrated in the figures can be arranged and organized differently to result in embodiments which are still within the scope of the present invention.

Figure 1:
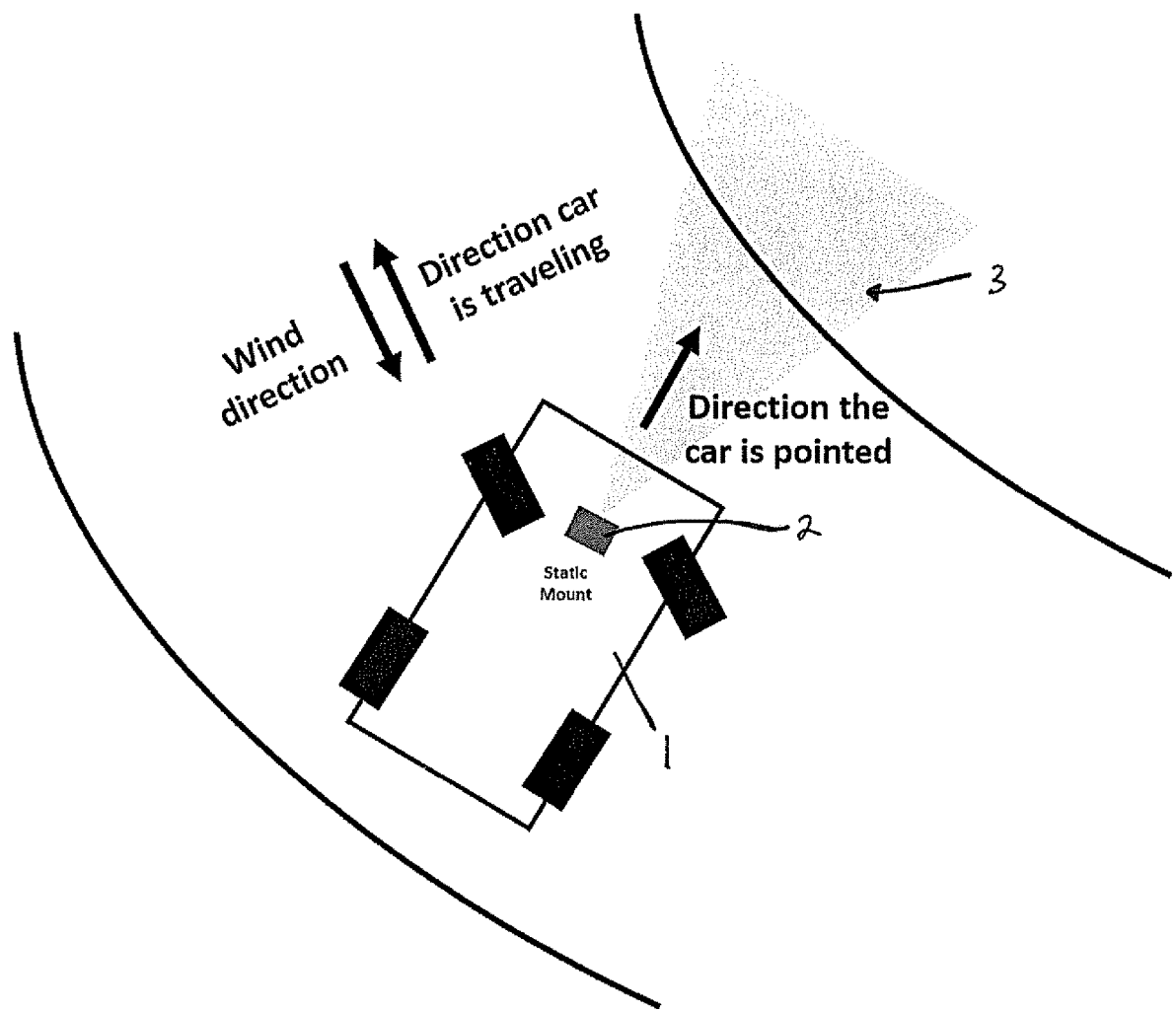
Figure 2:
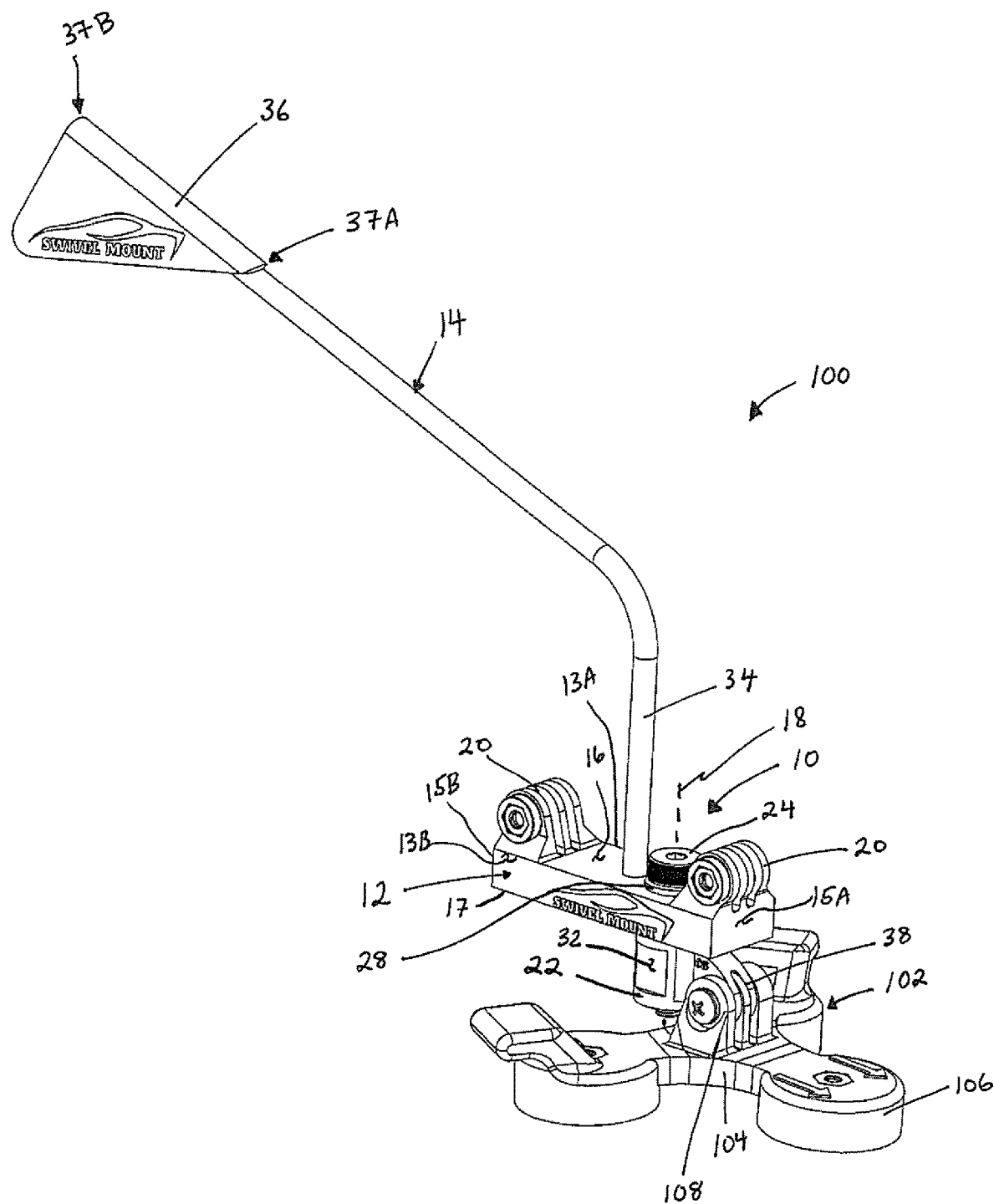
Figure 3:
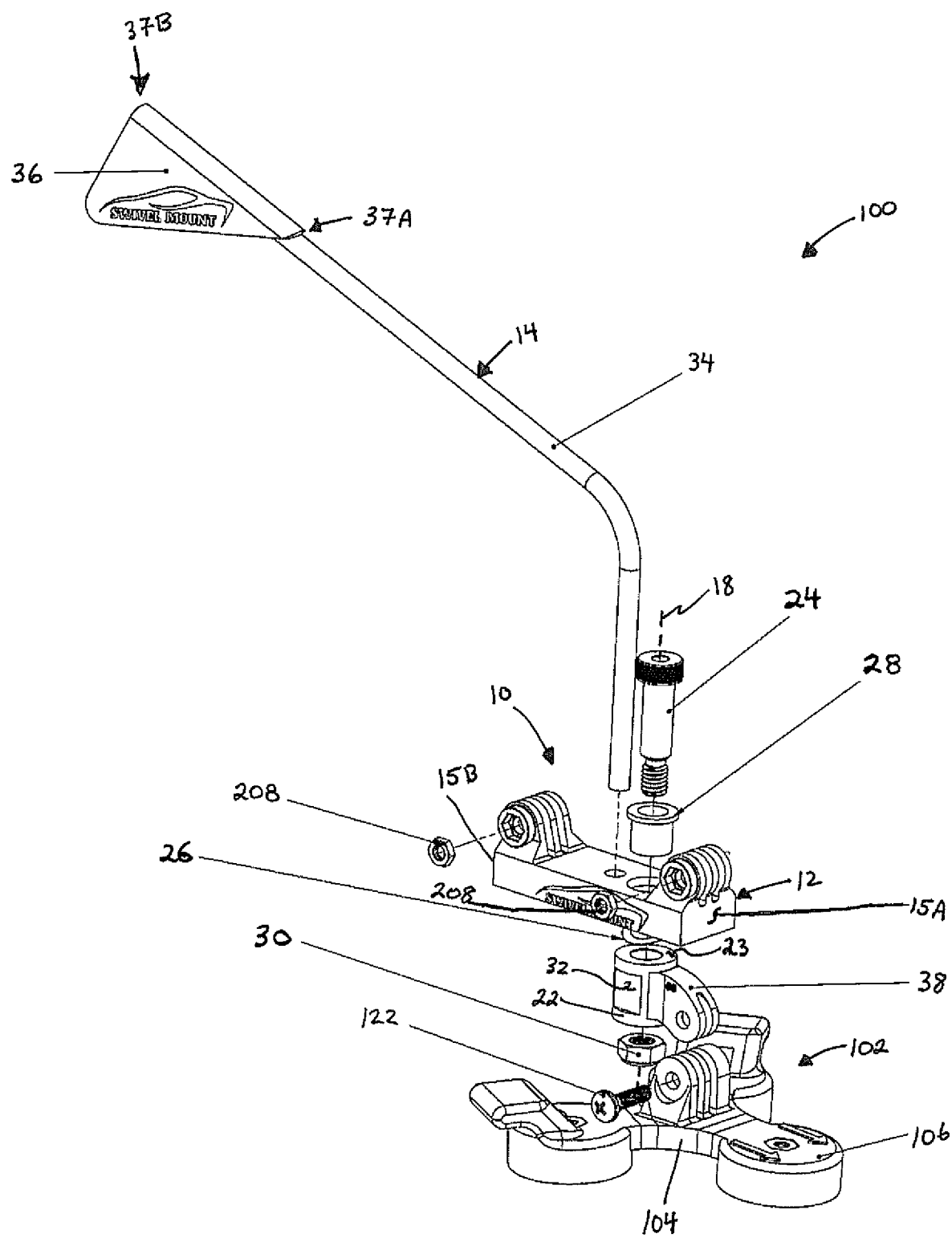
Figure 4:
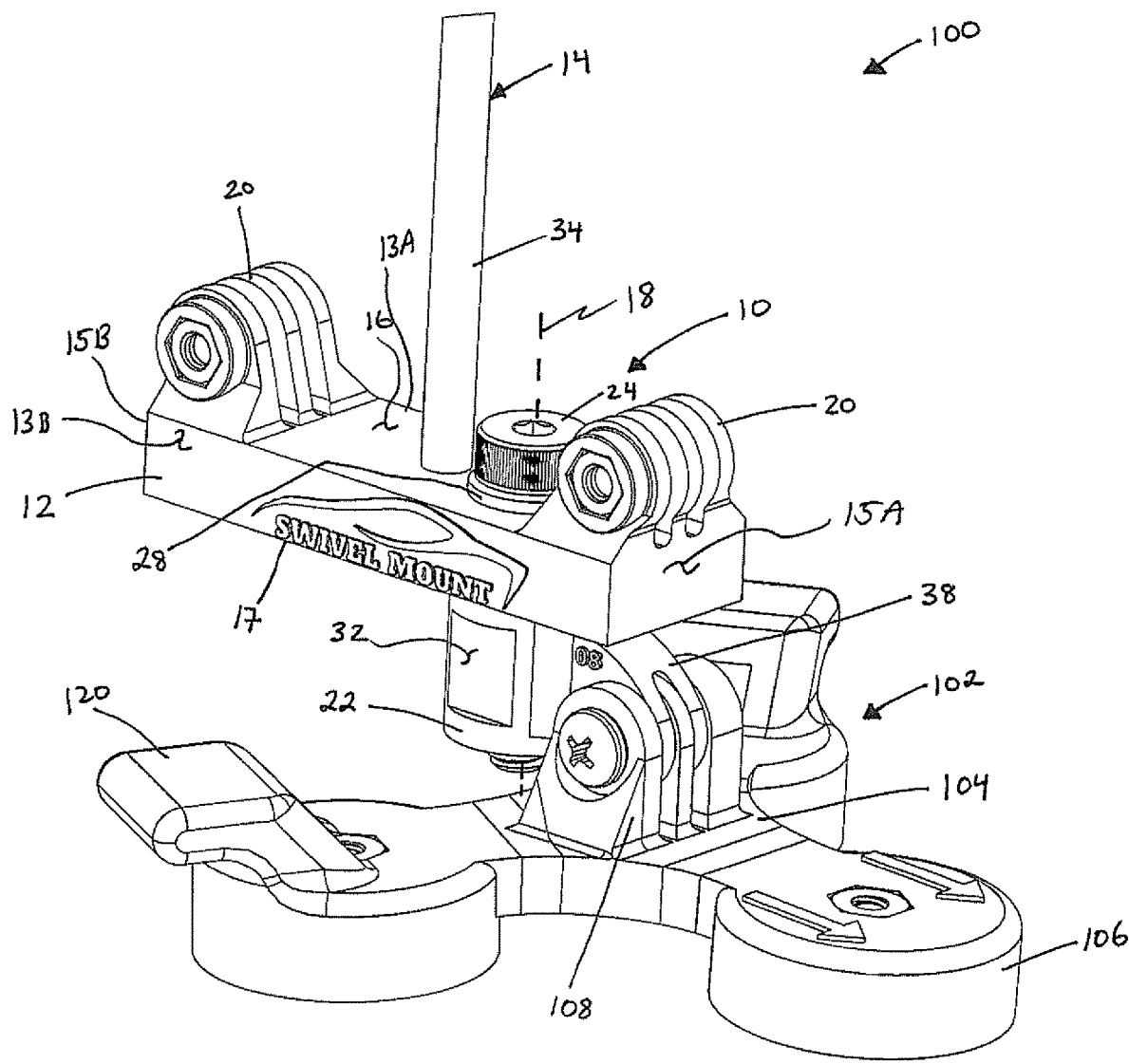
Figure 5A:
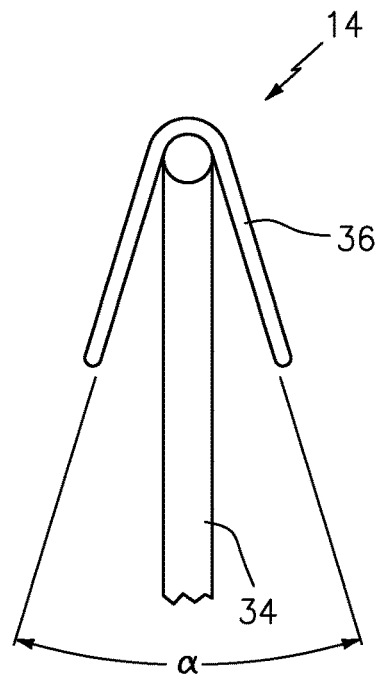
Figure 5B:
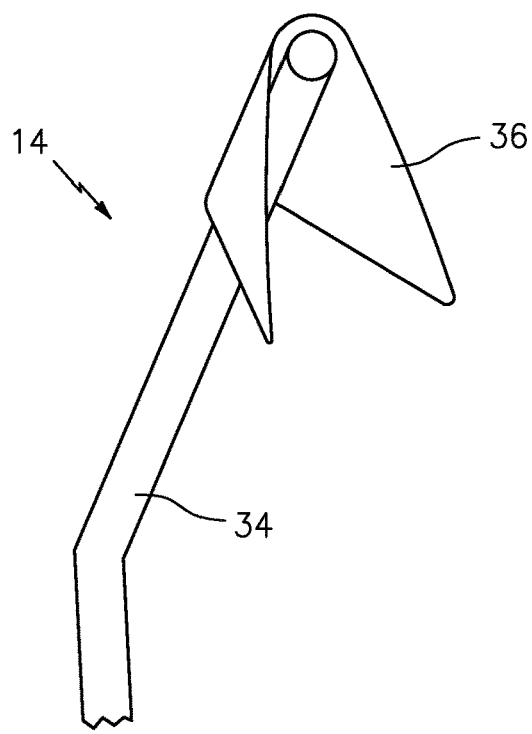
Figure 6:
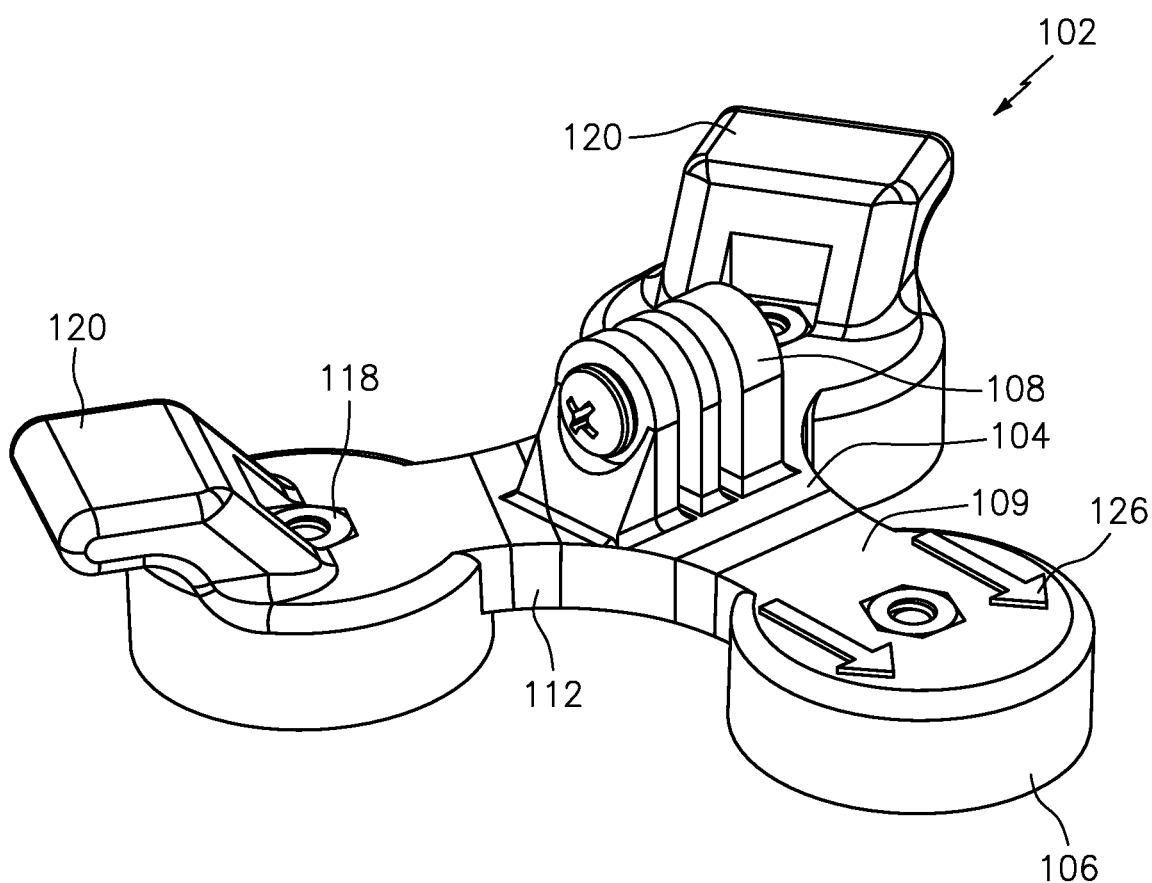
Figure 7:
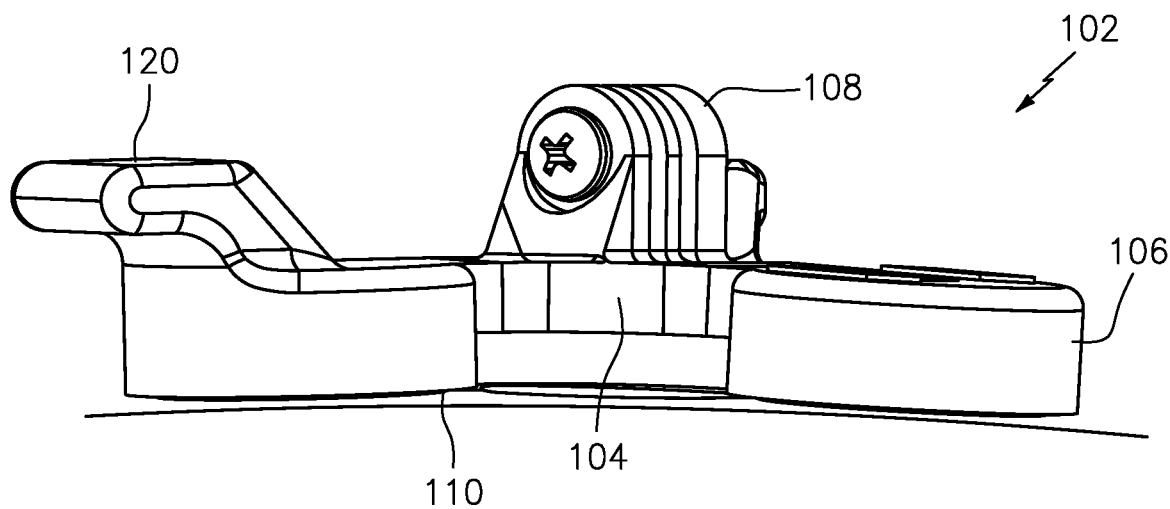
Figure 8:
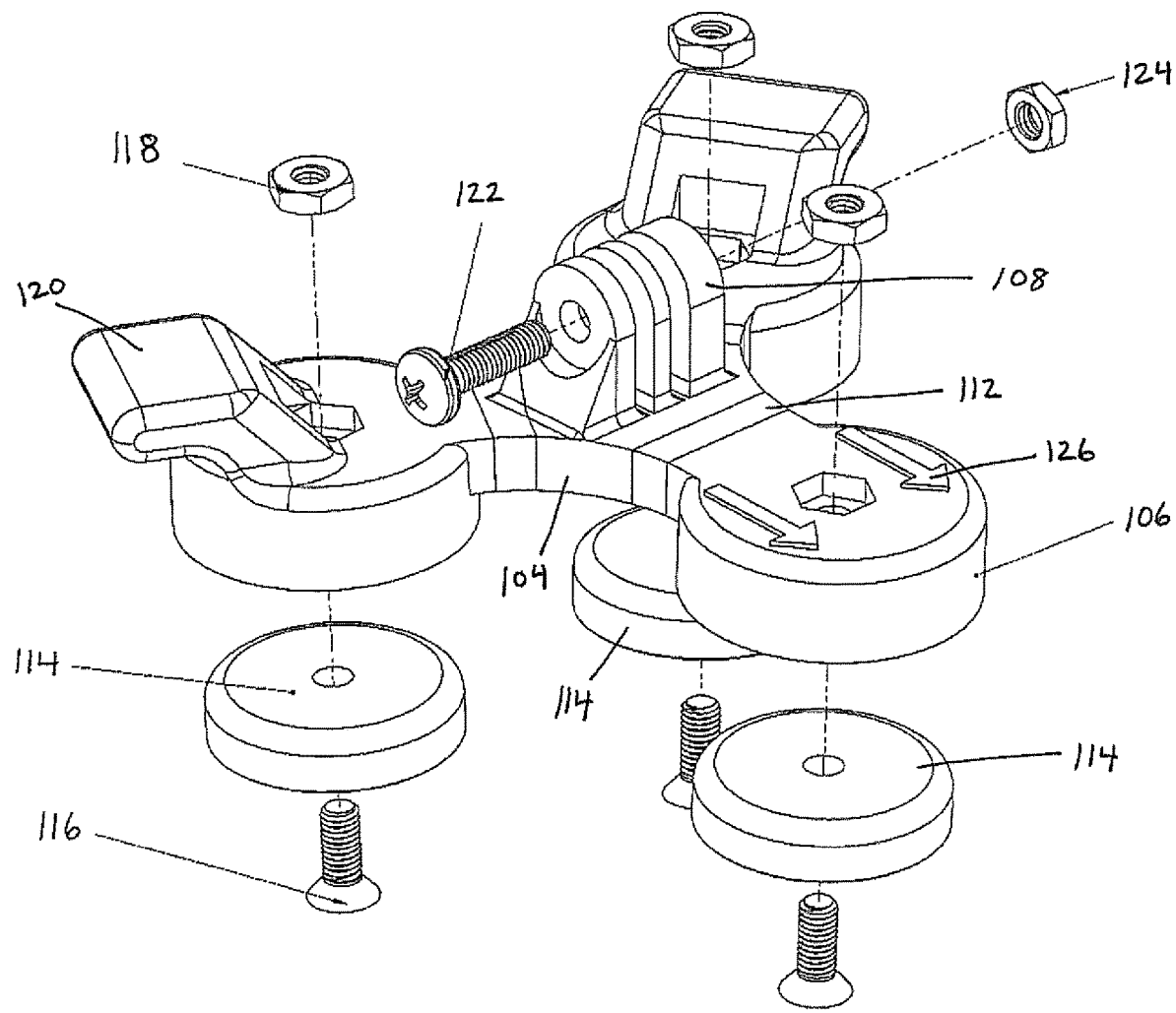
Figure 9:
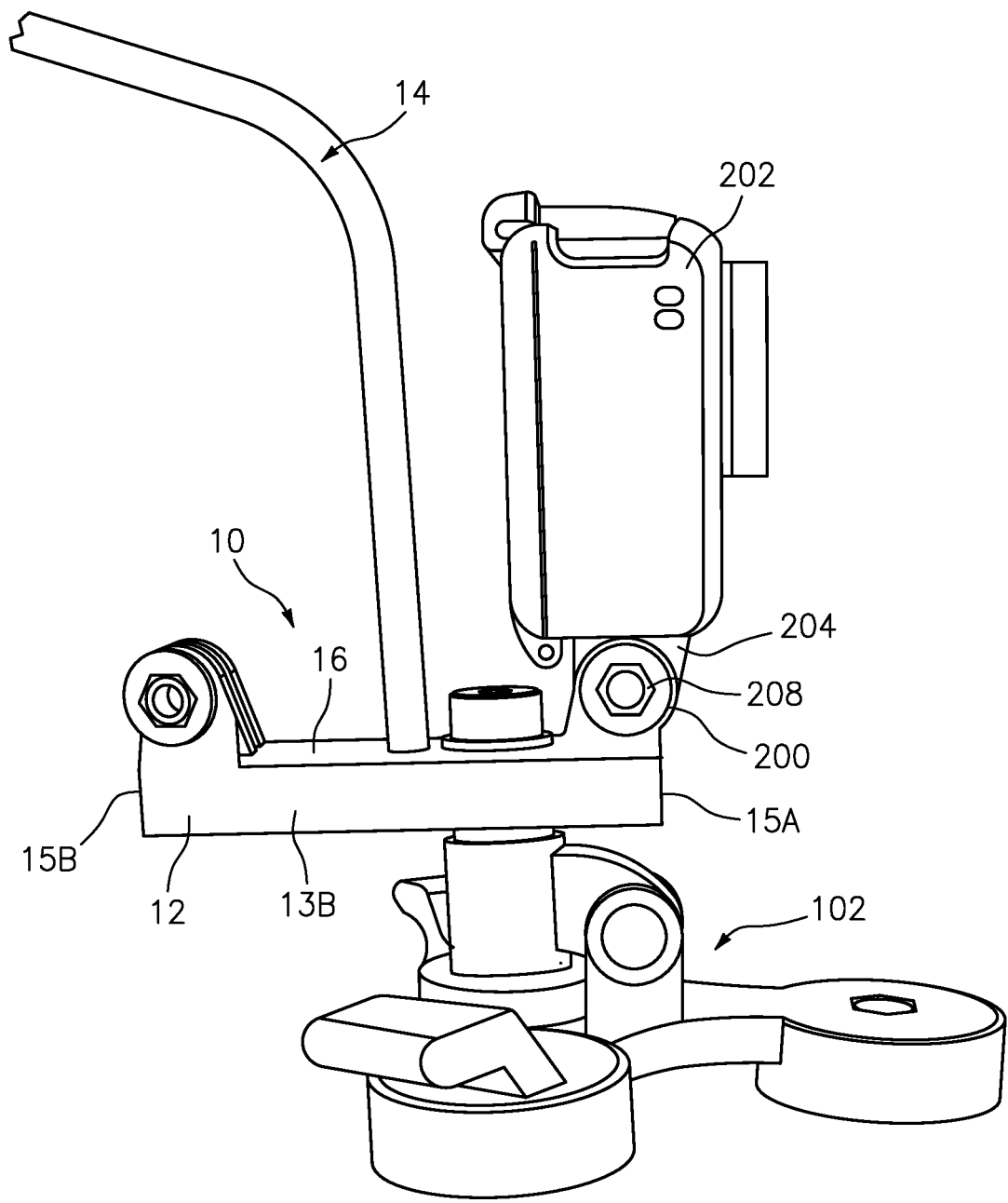
Figure 10:
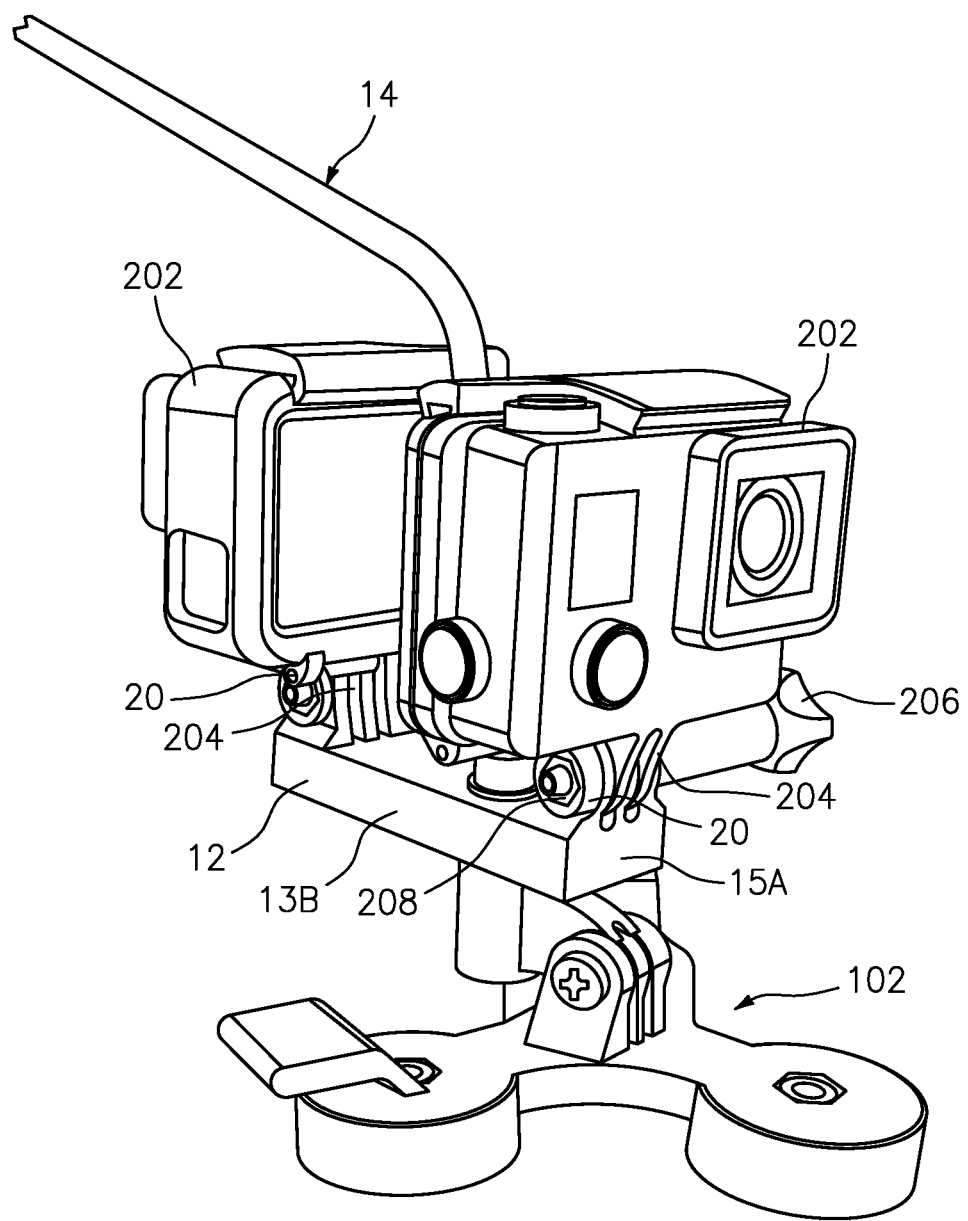
Figure 11:
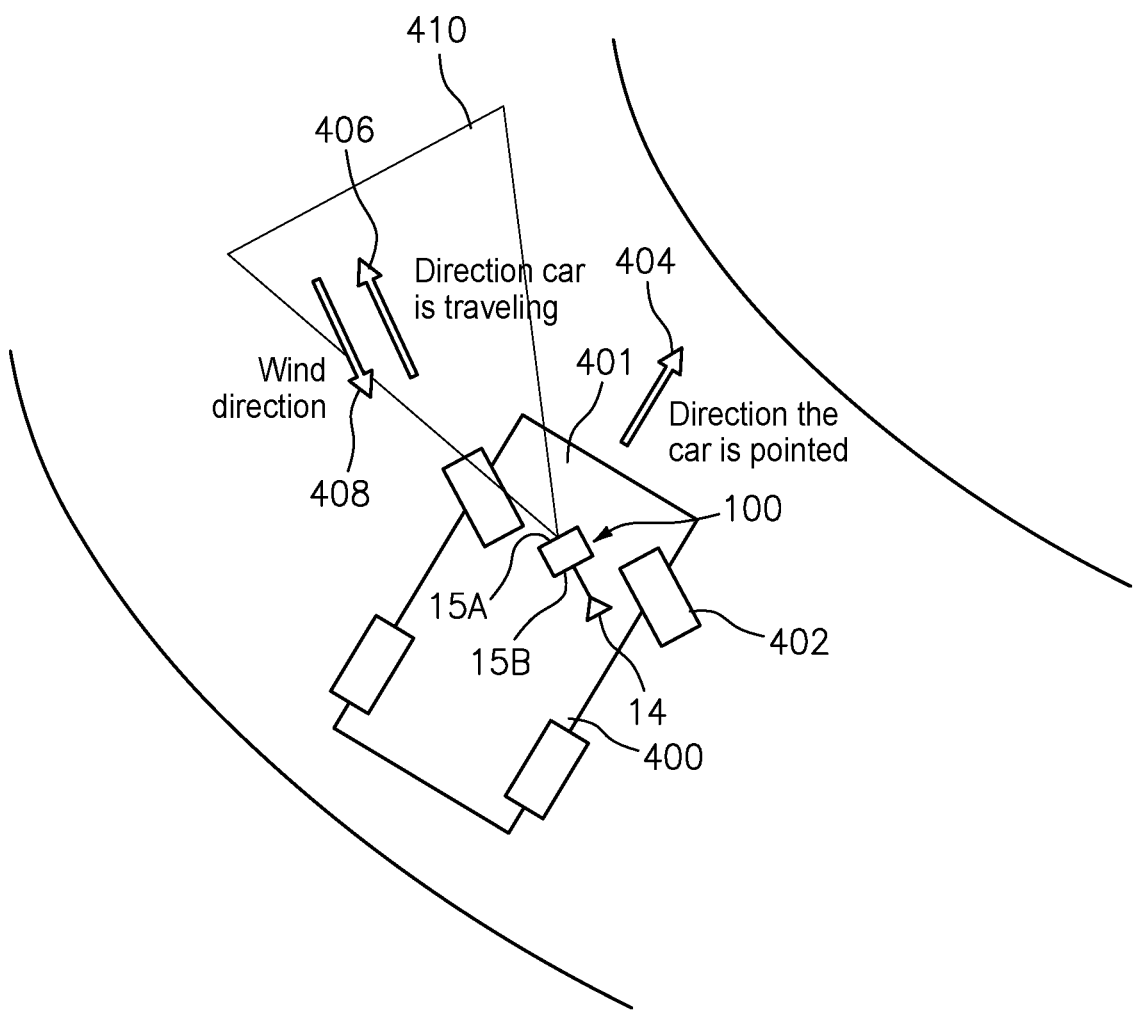
Figure 12:
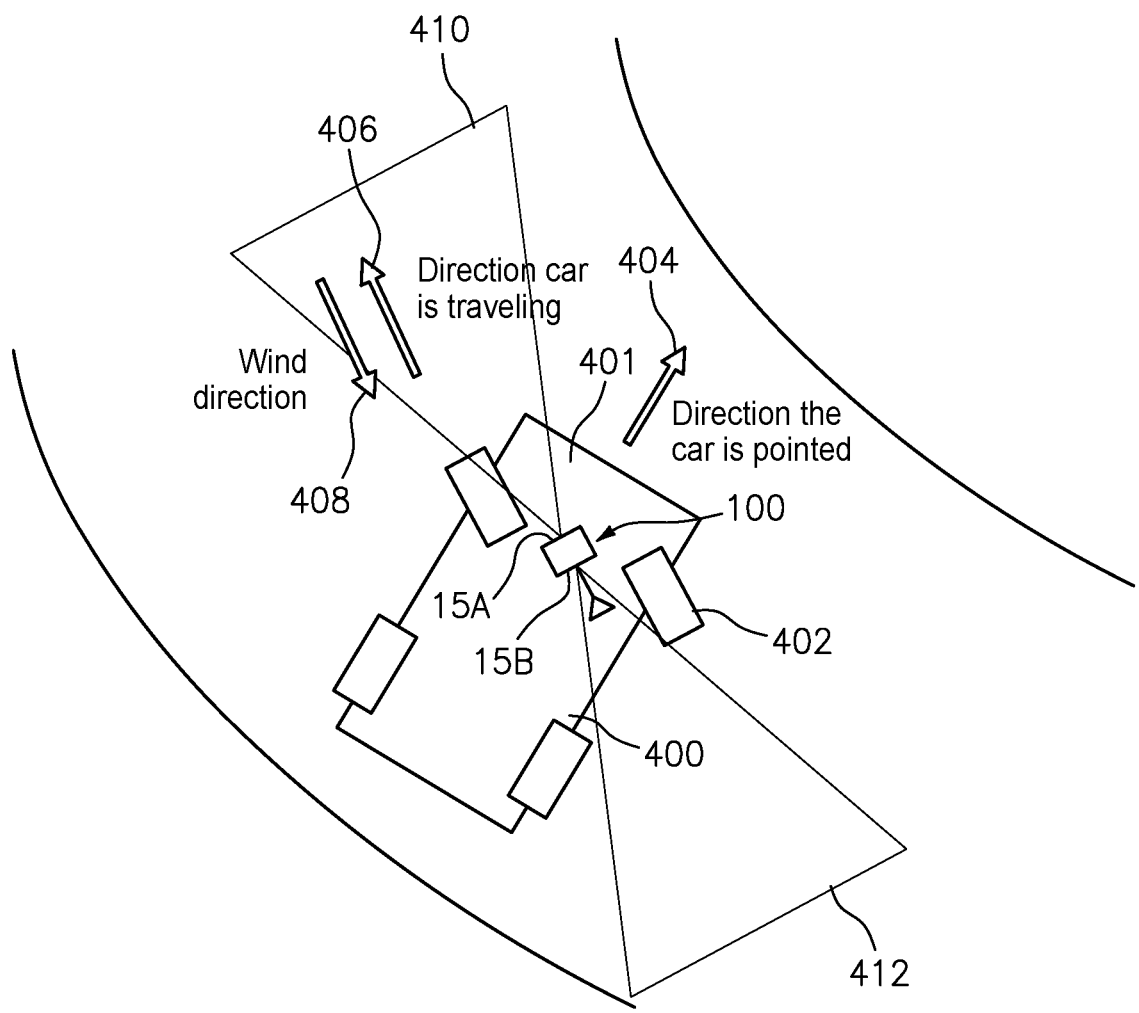

To assist those of ordinary skill in the art in making and using the disclosed assemblies, systems and methods, reference is made to the appended figures, wherein:

FIG. 1 schematically depicts a static camera mount positioned with respect to a surface of a vehicle according to the prior art;

FIG. 2 schematically depicts an assembled perspective view of an exemplary camera and base mount assembly according to the present invention;

FIG. 3 schematically depicts an exploded perspective view of an exemplary camera and base mount assembly according to the present invention;

FIG. 4 schematically depicts a magnified view of FIG. 2 according to the present invention;

FIG. 5A schematically depicts a back view of an exemplary wind vane assembly according to the present invention;

FIG. 5B schematically depicts a perspective view of an exemplary wind vane assembly according to the present invention;

FIG. 6 schematically depicts a perspective view of an exemplary mounting base assembly according to the present invention;

FIG. 7 schematically depicts a side view of an exemplary mounting base assembly according to the present invention;

FIG. 8 schematically depicts an exploded perspective view of an exemplary mounting base assembly according to the present invention;

FIG. 9 schematically depicts a side view of an exemplary camera and base mount assembly including one recording device according to the present invention;

FIG. 10 schematically depicts a perspective view of an exemplary camera and base mount assembly including two recording devices according to the present invention;

FIG. 11 schematically depicts an exemplary camera and base mount assembly including one recording device mounted with respect to a surface of a vehicle according to the present invention; and FIG. 12 schematically depicts an exemplary camera and base mount assembly including two recording devices mounted with respect to a surface of a vehicle according to the present invention.

Like parts are marked throughout the specification and drawings with the same reference numerals.

DETAILED DESCRIPTION OF THE INVENTION

The present invention relates generally to a rotatable camera mount capable of capturing images/video in one or more directions. In one preferred embodiment, the present invention relates generally to a rotatable camera mount capable of capturing images/video in a direction in which an object is traveling (or has traveled).

It should be understood, however, that the disclosed embodiments are merely illustrative of the present invention, which may be embodied in various forms. Therefore, details disclosed herein with reference to exemplary assemblies/fabrication methods and associated processes/techniques of assembly and use are not to be interpreted as limiting, but merely as the basis for teaching one skilled in the art how to make and use the advantageous assemblies/systems of the present invention.

As used herein, "a," "an," and "the" refer to both singular and plural referents unless the context clearly dictates otherwise.

As used herein, the term "about" and "substantially" refer to a measurable value such as a parameter, an amount, a temporal duration, and the like and is meant to include variations of +/−15% or less, preferably variations of +1-10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" and "substantially" refer is itself specifically disclosed herein.

As used herein, spatially relative terms, such as "beneath", "below", "lower", "above", "upper", "front", "back", "top", "bottom", "left", "right", and the like, are used for ease of description to describe one element or features relationship to another element(s) or feature(s). It is further understood that the terms "front" and "back", "top", "bottom", "left", "right" are not intended to be limiting and are intended to be interchangeable where appropriate.

As used herein, the terms "comprise(s)" and/or "comprising," specify the presence of stated features, integers, steps, operations, elements, and/or components, but do not preclude the presence or addition of one or more other features, integers, steps, operations, elements, components, and/or groups thereof.

As used herein, the terms "configure" and/or "configured," refer to the capability of a component and/or assembly but do not preclude the presence or addition of other capabilities, features, components, elements, operations, and any combination thereof.

As used herein, an "object" may refer to a movable or unmovable item, including but not limited to, a vehicle, a piece of furniture, a house, a shrub/tree, and iterations thereof. It should be appreciated that any item can be considered an "object" as it pertains to this disclosure and this disclosure does not intend to limit the definition of an "object". As such, the above non-limiting examples are merely intended as context for use of the invention.

As used herein, a "vehicle" may refer to any manned or unmanned machine that is capable of transporting people, cargo, animals, and combinations/iterations thereof, which may include both motorized and non-motorized vehicles. In a non-exhaustive list, a "vehicle" may include wagons, bicycles, motor vehicles (e.g., cars, trucks, buses, motorcycle, all-terrain vehicle), railed vehicles (e.g., train, tram), watercraft (e.g., boat, ship, personal watercraft, surfboard), amphibious vehicles, aircraft (e.g., helicopter, airplane, drone), spacecraft, and combinations/iterations thereof.

FIGS. 2-4 depict a camera mount assembly 10 including a body 12 and a wind vane 14. The body 12 may be capable of being directly/indirectly interfaced with the wind vane 14. At least a portion of the camera mount assembly 10 may be capable of being rotated about an axis of rotation 18. The at least a portion of the camera mount assembly 10 may be rotatable about the axis of rotation 18 with respect to a mounting surface on an object (e.g., a vehicle). The camera mount assembly 10 may be capable of rotating roughly 360 degrees about the axis of rotation 18. However, it is also appreciated that the camera mount assembly 10 may be intentionally restricted to a degree of rotation less than 360 degrees. The wind vane 14 may, at least in part, be capable of directly/indirectly assisting with the rotation of the camera mount assembly 10. The body 12 may directly/indirectly interface with at least one camera or other recording device (see FIGS. 9 and 10). The at least one camera may be directly/indirectly mounted with respect to a corresponding camera attachment 20.

The functionality and features of the camera mount assembly 10 are described in more detail below.

The body 12 may define a top surface 16, a bottom surface 17 and sidewalls 13A, 13B, 15A, and 15B extending therebetween. One or more surfaces of the body 12 may resemble a quadrilateral (e.g., a rectangle, a square, a trapezoid), a circle, a triangle, and combinations thereof. The body 12 may resemble a cylinder, a quadrilateral prism (e.g., a cube, a rectangular prism or cuboid), a sphere, and combinations thereof. In some instances, the axis of rotation 18 may extend through the top surface 16 and the bottom surface 17 and may be positioned between the central portion of the top surface 16 and the sidewall 15A.

The wind vane 14 may be mounted with respect to a surface of the body 12 and extend outwardly therefrom. In some instances, the wind vane 14 may be mounted with respect to the top surface 16 of the body 12 and extend outwardly therefrom (i.e., in a direction opposite the bottom surface 17). However, it should be appreciated that the wind vane 14 may be mounted with respect to a different surface of the body 12 without departing from the spirit/scope of this invention. The wind vane 14 may be permanently or semi-permanently mounted with respect to the body 12. The wind vane 14 may be positioned in close proximity to the central portion of the top surface of the body 12.

The wind vane 14 may include a pole 34 extending outwardly from the top surface of the body 12 and a flag 36 mounted directly/indirectly with respect to the pole 34. The flag 36 may be mounted directly/indirectly with respect to the pole 34 at a predetermined position. The pole may define a first end and a second end, wherein the first end of the pole may be mounted with respect to the top surface 16 of the body 12. The pole may extend in a direction opposite the bottom surface 17 of the body 12. The pole may be angled in a direction opposite the axis of rotation 18, such that the second end of the pole is further from the axis of rotation 18 than the first end of the pole. The flag may be mounted in close proximity with respect to the second end of the pole (e.g., at positions 37A and 37B).

The pole 34 may define an angle that is greater than 90 degrees with respect to the top surface 16 of the body 12. The pole 34 may also define an angle that is less than 180 degrees with respect to the top surface 16 of the body 12. In a non-limiting example, the pole 34 may define an angle that is between about 105 degrees and about 115 degrees with respect to the top surface 16 of the body 12. The pole 34 may be fabricated from a variety of materials, including but not limited to, various polymers, reinforced polymers, composite materials, and metals. Exemplary polymers include acrylates and nylons. Alternatively, the pole 34 may be fabricated from fiberglass. The material may be resistant to corrosion or, in the case of certain metals, may be modified (e.g., coated) accordingly. For example, the pole 34 may be metal that is anodized to provide at least some corrosion resistance. In a non-limiting example, the pole 34 may be fabricated from an impact resistant polymer (e.g., a thermoplastic).

As depicted in FIGS. 2 and 3, the side view of the flag 36 may define a triangular shape. For example, the height of the flag 36 may be greater at a position 37B further from the angled portion of the pole 34 than at a position 37A closer to the angled portion of the pole 34. The flag 36, as further depicted in FIGS. 5A and 5B, may define a triangular shape relative to the pole 34. Particularly, the flag 36 may define two angled portions that are tangential to the pole 34. The triangularly-shaped flag 36 may define an angle ($\alpha$) that is greater than about 0 degrees and less than about 180 degrees. In a non-limiting example, the triangularly-shaped flag 36 may define an angle ($\alpha$) that is between about 25 degrees and about 35 degrees. Preferably, the triangularly-shaped flag 36 may have an angle ($\alpha$) that is about 30 degrees. The defined angle of the triangular-shaped flag 36 may, at least in part, depend on the parameters of the camera mount assembly 10. For example, a flag 36 with a larger angle may provide greater downforce and thus allow for a smoother rotation of the camera mount assembly 10. However, too large of an angle may negatively affect the free movement of the camera mount assembly 10. Thus, the angle (a) may depend on characteristics of the camera mount assembly 10, for example, the camera parameters, the position of the camera(s), and the quantity of cameras.

The flag 36 may be manufactured from a single piece of material or may be manufactured from two or more pieces of material. As shown in FIGS. 5A and 5B, the flag 36 may be bent/folded around the pole 34 such that the flag 36 may define the triangular shape. The flag 36 and the pole 34 may be affixed using traditional manufacturing techniques, including but not limited to, fasteners, adhesives, chemical bonding, and combinations thereof. The flag 36 may be manufactured from a variety of materials, including but not limited to, various polymers, reinforced polymers, composite materials, and metals. Exemplary polymers include acrylates and nylons. Alternatively, the flag 36 may be fabricated from fiberglass. The material may be resistant to corrosion or, in the case of certain metals, may be modified (e.g., coated) accordingly. For example, a flag 36 fabricated from metal may be anodized to provide at least some corrosion resistance. In a non-limiting example, the flag 36 may be fabricated from a high strength UV resistant acrylic.

In some embodiments, the camera mount assembly 10 may further include a body attachment component 22 mounted directly/indirectly with respect to the body 12. The body attachment component 22 may be capable of being engaged directly/indirectly with a mounting surface of an object (e.g., a vehicle). The body 12 and the body attachment component 22 may be mounted with respect to each other so as to further define the axis of rotation 18. In some instances, the body 12 may be configured to rotate with respect to the body attachment component 22. For example, the body 12 may be capable of being rotated with respect to the axis of rotation 18, which may be defined by both the body 12 and the body attachment component 22. However, it should be appreciated that the body 12 and the body attachment component 22 may be a single component.

The body 12 and the body attachment component 22 may be mounted with respect to each other by a shaft (e.g., bolt, screw, pin, rivet, dowel, fastener). The fastener 24 may be visible, as shown in the figures, or may be hidden inside one or more of the components (e.g., body 12, body attachment component 22). A fastener engaging component 30 (e.g., nut, pin, rivet end) may be mounted with respect to the body attachment component 22 to directly/indirectly engage with the fastener 24. The fastener 24 may be aligned with the axis of rotation 18. In some instances, the body 12 may rotate about the fastener 24 in direct or indirect contact thereto.

A preload may be applied to the body 12 and the body attachment component 22. The preload may, in part, impact the rotational resistance experienced by the body 12 as the body 12 rotates with respect to the body attachment component 22. For example, the amount of preload may correspond to the amount of force required to rotate the body 12. The force may be generated in part by the speed of a vehicle and/or by the airflow traveling past the body 12. Thus, the more preload applied, the more rotational resistance experienced by the body 12 such that a greater force is necessary to rotate the body 12. In contrast, the less preload applied, the less rotational resistance experienced by the body 12 such that less force is necessary to rotate the body 12.

Particularly, the fastener 24 and a spring mechanism 26 (e.g., helical spring, disc spring) may be configured, in part, to apply a preload onto the body 12 and the body attachment component 22. By adjusting the preload, the body 12 can rotate more freely with respect to the body attachment component 22. For example, the more the spring mechanism 26 is compressed, the slower the body 12 rotates, with more force required to rotate the body 12. Adjustment of the preload, if necessary, may be manually adjusted by a user.

The body 12 and the body attachment component 22 may include a component that assists with the rotation of the body 12. For example, at least one rotation-assisting component 28 may be mounted directly/indirectly with respect to the body 12, the body attachment component 22, or the body 12 and the body attachment component 22. The rotation-assisting component 28 (e.g., a bushing, a bearing, a lubricant, and combinations thereof) may be a component that reduces the friction between any of the rotational components, including but not limited to, the body 12, the body attachment component 22, the fastener 24, and combinations thereof.

In an exemplary embodiment, the body 12 may be mounted directly/indirectly with respect to the body attachment component 22 such that the body 12 is capable of being rotated about the axis of rotation 18 with respect to the body attachment component 22. The body 12 may define a through hole extending between a top surface 16 of the body 12 to a bottom surface 17 of the body 12 which may be substantially aligned with the axis of rotation 18. A rotation-assisting component 28 (e.g., bushing) may be mounted with respect to the through hole and may be aligned with the axis of rotation 18. A fastener 24 (e.g., shoulder bolt) may be mounted with respect to the rotation-assisting component 28 and aligned with the axis of rotation 18 such that the combination of the body 12 and the rotation-assisting component 28 may rotate freely about the fastener 24. The fastener 24 may extend outwardly from the bottom surface of the body 12 to engage with a fastener engaging component 30 (e.g., nut) mounted with respect to the body attachment component 22. In some instances, the fastener engaging component 30 may be embedded (or recessed) within the body 12 and/or the body attachment component 22. A spring mechanism (e.g., disc spring) 26 may be positioned between the bottom surface 17 of the body and the top surface 23 of the body attachment component 22 such that the spring mechanism 26 is aligned with the axis of rotation 18. The fastener 24 may extend through a hole in the spring mechanism 26.

The fastener 24 may be rotated into the fastener engaging component 30 such that the spring mechanism 26 is at least partially compressed, thereby applying a preload. The amount of preload may be manually adjusted given the operating conditions (e.g., speed of the vehicle, air resistance, number of cameras, etc.). The body attachment component 22 may define a flattened feature 32 that is capable of being engaged with a wrench (or other tool). Thus, the flattened feature 32 may assist a user in tightening the fastener by enabling a user to stably hold the body attachment component 22. However, it should be appreciated that the fastener 24 may be tightened without the use of a tool.

The body attachment component 22 may be capable of being directly/indirectly engaged with a surface of an object (e.g., a vehicle). For example, the body attachment component 22 may define at least one engagement feature/element, including but not limited to, suction cup(s), spring clip(s), magnet(s), pole clamp(s), and combinations thereof. The body attachment component 22 may also define at least one base mount attachment feature 38. The base mount attachment feature 38 may be configured to directly/indirectly engage with a corresponding attachment feature.

For example, the base mount attachment feature 38 may define a two-prong attachment feature configured to engage with a corresponding three-prong attachment feature, as well known and standardized in the art. It should be appreciated that the base mount attachment feature 38 may define a three-prong attachment feature configured to engage with a corresponding two-prong attachment feature, without departing from the spirit/scope of this invention.

As depicted in FIGS. 2-4, a camera and base mount assembly 100 may include the camera mount assembly 10 which may be mounted directly/indirectly with respect to a mounting base assembly 102. The mounting base assembly 102 may include a mounting base 104 and at least one mounting element (e.g., a magnet, a suction cup, a clip). It should be appreciated, however, that the mounting base 104 and the at least one mounting element may be fabricated into a single component or may include multiple components without departing from the spirit/scope of this invention. The mounting base may define at least one mounting feature 106. The at least one mounting feature 106 may be capable of being directly/indirectly engaged with a surface of an object (e.g., a vehicle). The mounting base 104 may further define at least one connecting arm 112 positioned in close proximity to the at least one mounting feature 106.

The mounting base 104 may define a camera mount assembly attachment feature 108 which may be capable of being directly/indirectly engaged with the camera mount assembly 10. For example, the camera mount assembly attachment feature 108 of the mounting base 104 may be capable of being directly/indirectly engaged with the base mount attachment feature 38 of the camera mount assembly 10, as described above. The camera mount assembly 10 may be capable of being tilted relative to the mounting base 104 when the base mount attachment feature 38 is mounted directly/indirectly with respect to the camera mount assembly attachment feature 108. The camera mount assembly 10 may also be capable of being tilted greater than 180 degrees relative to the mounting base 104.

A retention feature/element may be mounted directly/indirectly with respect to the camera mount assembly attachment feature 108 and the base mount attachment feature 38. Particularly, a retention fastener 122 may be in direct/indirect contact with respect to the camera mount assembly attachment feature 108 and the base mount attachment feature 38. If used, the retention fastener 122 partially restricts movement of the camera mount assembly 10 relative to the mounting base 104. Further, a retention nut 124 may correspond with the retention fastener 122 to at least partially assist with restricting movement of the camera mount assembly 10, for example when the retention fastener 122 and retention nut 124 are tightened together. However, it should be appreciated that other features/elements may be utilized to at least partially restrict movement of the camera mount assembly 10 with respect to the mounting base 104.

Although the various features (e.g., mounting feature 106, camera mount assembly attachment feature 108, connecting arm 112) of the mounting base 104 are depicted as a single component, it should be appreciated that one or more of the various features may be a separate component that is capable of being interfaced with the mounting base 104. For example, one or more of the various features (e.g., mounting feature 106, camera mount assembly attachment feature 108, connecting arm 112) may be mounted with respect to the mounting base 104 using traditional manufacturing techniques (e.g., welding, adhesive, fastener). Moreover, one or more of the various features may define geometric features that correspond to geometric features defined by the mounting base 104.

As further depicted in FIGS. 6-8, the mounting base 104 may define three mounting features 106 capable of being directly/indirectly engaged with a surface of an object (e.g., a vehicle). The three mounting features 106 and each respective connecting arm 112 may be arranged in a three-pointed star configuration. For example, each of the mounting features 106 may be positioned at a substantially equal distance from each of the adjacent mounting features 106. In other words, each of the mounting features 106 may be positioned at an angle of about 120 degrees with reference to each adjacent mounting feature 106.

In one embodiment, the mounting features 106 are capable of being directly/indirectly engaged with one or more magnets 114. Each mounting feature 106 may define at least one cavity extending inwardly from the bottom surface 110 in the direction of the top surface 109. The at least one cavity may be capable of at least partially receiving the one or more magnets 114. In one embodiment, the cavity may be capable of fully receiving the one or more magnets 114 such that the one or more magnets 114 is recessed below the bottom surface 110. In such instances, the magnet(s) 114 would not contact the surface of the vehicle. The magnet(s) 114 may be any magnet of sufficient strength to at least semi-permanently retain the mounting base 104 to a surface of an object (e.g., a vehicle). In some embodiments, the magnet(s) 114 may be of sufficient strength to at least semi-permanently retain the camera and base mount assembly 100 to a surface of an object (e.g., a vehicle). For example, neodymium magnets were found to have sufficient strength to maintain engagement with a moving vehicle.

Although the mounting base assembly 102 is described with the use of magnets, it should be appreciated that additional attachment elements may be used, including but not limited to, suction cups, spring clips, fasteners, and combinations thereof to semi-permanently or permanently retain the mounting base 104 or the camera and base mount assembly 100 to a surface of an object.

The mounting base 104 may define one or more features to engage with the at least one magnet 114. Particularly, each mounting feature 106 may define one or more features to engage with the at least one magnet 114. For example, the mounting feature 106 may define one or more features to at least partially retain the at least one magnet 114 such that the at least one magnet 114 is retained by at least one tab (not shown). The at least one magnet 114 may be "snapped" into place at least partially within the cavity of the mounting feature 106.

In some instances, fasteners (e.g., pin, rivet, bolt, screw) and/or adhesive may be used to at least partially retain the at least one magnet 114 with respect to the mounting feature 106. For example and as depicted in FIGS. 6 and 8, a magnet fastener 116 and corresponding magnet nut 118 may be used to at least partially retain the at least one magnet 114 with respect to the mounting feature 106. The magnet fastener 116 and corresponding magnet nut 118 may be at least partially recessed below a surface of the mounting base 104 (e.g., the top surface 109, the bottom surface 110).

The mounting base 104 may define a curvature with respect to at least a portion of the bottom surface 110, as depicted in FIG. 7. Said differently, at least a portion of the bottom surface 110 of the mounting base 104 may define a curvature of a predetermined radius. In a non-limiting example, at least a portion of the bottom surface 110 of the mounting base 104 may define a radius of curvature of about 35 inches. At least a portion of the bottom surface of at least one connecting arm 112 and the respective mounting feature 106 may define a curvature of a predetermined radius. At least a portion of the bottom surface of at least one mounting feature 106 may define a curvature of a predetermined radius. The curvature of the mounting base 104 may provide an advantageous engagement to a surface of an object that has a rounded contour (e.g., motor vehicle hood and roof) versus a traditional flat-bottomed mounting base. Moreover, the mounting base 104 defining a curvature, as described above, may provide an advantageous engagement on a flat surface of an object or on a partially flat surface.

In some embodiments, at least one connecting arm 112 and the respective mounting feature 106 may be angled such that the bottom surface 110 of the mounting base 104 is not planar. For example, each of the connecting arms 112 and the respective mounting feature 106 may be angled. In some embodiments, a mounting base 104 defining three mounting features 106 and three connecting arms 112, arranged in a three-pointed star configuration, may be angled such that the bottom surface 110 of the mounting base 104 defines a cone shape with respect to the mounting features 106 and the connecting arms 112.

The mounting base 104 may be fabricated from a variety of materials, including various polymers, reinforced polymers, composite materials and metals. Exemplary polymers include acrylates and nylons. Alternatively, the mounting base 104 may be fabricated from fiberglass. The material may be resistant to corrosion or, in the case of certain metals, may be modified (e.g., coated) accordingly. For example, the mounting base 104 may be metal that is anodized to provide at least some corrosion resistance. In a non-limiting example, the mounting base 104 may be fabricated from a UV-resistant polymer. Depending on the selected material, the mounting base 104 may be rigid. The connecting arm(s) 112 may be rigid such that they minimally flex.

In another embodiment, the connecting arm 112 may be capable of being more flexible than other portions of the mounting base 104. For example, the connecting arm 112 may be fabricated from a material that exhibits increased flexibility. In such instances, the remainder of the mounting base 104 may be fabricated from a like material or from a different material (e.g., a more rigid material). In another example, the connecting arm 112 may define features that promote flexibility. The connecting arm 112 may be capable of being flexibly moved such that the mounting feature 106 may conform to the surface of an object in which it is mounting, regardless of the contour of the surface.

The mounting base 104 may define one or more features capable of assisting a user in at least partially disengaging the mounting base 104 from a surface of an object (e.g., vehicle). For example and as depicted in the figures, the mounting base 104 may define at least one tab 120. The at least one tab 120 may be configured such that a user can interact with the at least one tab 120 to at least partially disengage the mounting base 104 from a surface of an object. In an exemplary embodiment, and as shown in FIG. 6, the mounting base 104 may define at least two tabs 120, each tab 120 in close proximity to a corresponding mounting feature 106.

In another embodiment, the mounting base 104 may define two mounting features 106 capable of being directly/indirectly engaged with a surface of an object (e.g., a vehicle) and arranged adjacent to each other. The mounting base 104 may further define one or more connecting arms 112 positioned in close proximity to one or more mounting features 106. Similar to the above, the mounting base 104 may define a camera mount assembly attachment feature 108.

As mentioned above, the camera mount assembly 10 may be capable of being directly/indirectly engaged with at least one recording device (e.g., camera). As depicted in FIG. 9, the camera mount assembly 10 may include at least one camera attachment 20 which may be capable of being directly/indirectly engaged with a corresponding attachment feature 204 of a camera 202. Particularly, the body 12 of the camera mount assembly 10 may define at least one camera attachment 20. For example, the camera attachment 20 may define a two-prong attachment feature configured to engage with a corresponding three-prong attachment feature 204 of a camera 202, as well known and standardized in the art. It should be appreciated that the camera attachment 20 may define a three-prong attachment feature configured to engage with a corresponding two-prong attachment feature of a camera 202, without departing from the spirit/scope of this invention.

The camera 202 may be capable of being tilted relative to the body 12 of the camera mount assembly 10. Particularly, the camera 202 may be capable of being tilted relative to the body 12 of the camera mount assembly 10 when the corresponding attachment feature 204 is mounted directly/indirectly with respect to the camera attachment 20. A retention feature/element may be mounted directly/indirectly with respect to the camera attachment 20 and the corresponding attachment feature 204. Particularly, a retention fastener 206 may be in direct/indirect contact with respect to the camera attachment 20 and the corresponding attachment feature 204. The retention fastener 206 may at least partially restrict movement of the camera 202 relative to the body 12 of the camera mount assembly 10. The retention fastener 206 may be a fastener, such as a retention nut 208, in which a user can tighten by hand. Further, the retention nut 208 may correspond with the retention fastener 206 to at least partially assist with restricting movement of the camera 202. However, it should be appreciated that other features/elements may be utilized to at least partially restrict movement of the camera 202 with respect to the body 12 of the camera mount assembly 10.

The body 12 of the camera mount assembly 10 may define at least two camera attachments 20, as depicted in FIGS. 9 and 10. The at least two camera attachments 20 may be oppositely positioned from each other. For example, the at least two camera attachments 20 may extend from the top surface 16 of the body 12 in the direction of the wind vane 14 (e.g., in a direction opposite the bottom surface 17 of the body 12). At least one camera 202 may be mounted directly/indirectly with respect to one of the at least two camera attachments 20. In some instances, only one camera 202 may be mounted directly/indirectly with respect to the at least two camera attachments 20. In other instances, a camera 202 may be mounted directly/indirectly with respect to each of the at least two camera attachments 20. Each camera attachment 20 may be mounted directly/indirectly with respect to a corresponding attachment feature 204 of a camera 202. The camera attachment 20 and the corresponding attachment feature 204 may define a two and three-prong configuration, as described above. Moreover, each camera 202 may be capable of being tilted, as described above.

In operation, the camera mount assembly 10 is typically mounted with respect to a surface of an object (e.g., vehicle). For example, the camera and mount assembly 100 may be mounted with respect to a surface of a vehicle. Although the following is described in reference to a vehicle, it should be appreciated that any object may be substituted for the vehicle without departing from the spirit/scope of this invention.

In an exemplary embodiment, camera mount assembly 10 is mounted directly/indirectly with respect to a mounting base assembly 102 to define a camera and base mount assembly 100. Particularly, a base mount attachment feature 38 of the camera mount assembly 10, defining a two-prong attachment feature, may be mounted directly/indirectly with respect to a camera mount assembly attachment feature 108 of the mounting base assembly 102, defining a corresponding three-prong attachment feature. The camera mount assembly 10 may be capable of being tilted with respect to the mounting base assembly 102. The mounting base assembly 102 may be mounted with respect to a surface of a vehicle (e.g., using at least one magnet 114). The mounting base 104 of the mounting base assembly 102 may include indicia 126 (e.g., to notify a user of a desired direction of installation or information describing the assembly).

The camera mount assembly 10 may include a wind vane 14 including a pole 34 and a flag 36 mounted with respect to the pole 34, as described herein. The pole 34 of the wind vane 14 may be mounted with respect to a top surface 16 of the body 12 of the camera mount assembly 10. The pole 34 may be mounted in close proximity to the center of the top surface 16 of the body 12. The at least one camera attachment 20 may be positioned in close proximity to sidewall 15A and/or 15B. The camera mount assembly 10 may define an axis of rotation 18 positioned between sidewall 15A and the wind vane 14, as depicted in the figures.

The camera mount assembly 10 may include a camera 202 mounted directly/indirectly with respect to a body 12 of the camera mount assembly 10. Particularly, a camera attachment 20 of the camera mount assembly 10, defining a three-prong attachment feature, may be mounted directly/indirectly with respect to a corresponding attachment feature 204 of the camera 202, defining a corresponding two-prong attachment feature. The camera 202 may be capable of being tilted with respect to the camera mount assembly 10. Particularly, the camera mount assembly 10 may define two camera attachments 20, each of which may be capable of being interfaced with a camera 202. The body 12 of the camera mount assembly 10 may include indicia, as described above.

As depicted in FIG. 11, camera and base mount assembly 100, as described herein, is mounted with respect to a surface 401 (e.g., hood, roof, door) of a vehicle 400. As depicted, the direction the vehicle 400 is pointed 404 is different than the direction the vehicle 400 is traveling 406. For example, when a vehicle 400 is used for drifting, the vehicle 400 is intentionally skid sideways through a turn such that the front wheels 402 are pointing in the direction of travel 406. As the vehicle 400 travels in the direction represented by reference number 406, the wind travels towards the vehicle 400 in the direction represented by reference number 408. As the wind 408 travels past the camera and base mount assembly 100, the camera mount assembly 10 rotates to substantially align with the direction of the wind. Particularly, as the wind travels past (and against) the flag 36 of the wind vane 14, the wind vane 14 (and consequently the camera mount assembly 10) rotates to substantially align with the direction the wind is traveling 408. For example, position 37A of the flag 36 substantially aligns with the direction the wind is traveling 408.

Thus, a camera 202 mounted with respect to the sidewall 15A would have a camera field of view 410 pointing in nearly the same direction in which the vehicle is traveling 406. If a camera 202 is mounted with respect to the sidewall 15A, the camera 202 would have a field of view 410 opposite the direction in which the wind is traveling 408. Additionally, as shown in FIG. 12, if one camera 202 is mounted with respect to the sidewall 15A and another camera 202 is mounted with respect to the sidewall 15B then one camera 202 will have a field of view 410 in the direction the vehicle is traveling 406 and another camera will have a field of view 412 in the direction the wind is traveling 408 (i.e., the trajectory the vehicle has already traveled). It should be appreciated that a camera can be mounted with respect to sidewall 15A, sidewall 15B or a camera can be mounted with respect to each of sidewall 15A and sidewall 15B.

The present invention does not require a counterweight or other element of similar functionality (i.e., a swing-weight assembly described in Greenthal) to direct the camera towards a particular direction. In a preferred embodiment, the camera and base mount assembly 100 does not include a counterweight or other element of similar functionality.

Although the present invention has been described with reference to exemplary implementations, the present disclosure is not limited by or to such exemplary implementations. Rather, various modifications, refinements and/or alternative implementations may be adopted without departing from the spirit or scope of the present disclosure.

What is claimed is:

1. A rotatable camera mount assembly for positioning at least one recording device on a vehicle capable of moving in at least a first direction, the rotatable camera mount assembly comprising:
   a. a body defining a first surface, a second surface, and at least one sidewall extending therebetween, the body defining a through-hole extending from the first surface to the second surface of the body;
   b. a body attachment component, wherein the body attachment component defines a first surface, a second surface and at least one sidewall extending therebetween, the body attachment component defining a through-hole extending from the first surface to the second surface of the body attachment component,
      wherein the body attachment component is mounted to the second surface of the body with a fastener that extends through the through-hole of the body from the first surface of the body and through the through-hole of the body attachment component to the second surface of the body attachment component and is secured with a fastener engagement component, wherein the fastener defines an axis of rotation extending between the body and the body attachment component, wherein the body is capable of rotating with respect to the body attachment component,
      wherein the body attachment component comprises a base mount attachment feature on the at least one sidewall for coupling the body attachment component to a base mount assembly; and
   d. a wind vane assembly including a pole and a flag, wherein the pole defines a first end and a second end, wherein the first end of the pole is mounted with respect to the first surface of the body and the pole extends in a direction opposite the second surface of the body; the pole is angled in a direction opposite the axis of rotation, such that the second end of the pole is further from the axis of rotation than the first end of the pole, wherein the pole defines a fixed angle range between about 105 degrees and 115 degrees relative to the axis of rotation; and wherein the flag is fixedly mounted in close proximity with respect to the second end of the pole; the flag defines two angled portions tangentially positioned relative to the pole, wherein the two angled portions of the flag define an internal angle range between about 25 degrees and about 35 degrees; and wherein the body defines at least one camera attachment feature capable of engaging with the at least one recording device;
   wherein the body and the wind vane assembly are capable of being rotated in a direction of airflow traveling across the body and the wind vane assembly;
   wherein when the rotatable camera mount assembly comprising the at least one camera attachment feature engaged with the at least one recording device is mounted on the vehicle and the vehicle travels in a direction of travel, the rotatable camera mount rotates to capture images/video in the direction the vehicle is traveling,
   wherein the rotatable camera mount assembly does not require a counterweight to direct the recording device towards the direction of travel.

2. The rotatable camera mount assembly according to claim 1, wherein the body attachment component is capable of being mounted with respect to a mounting base.

3. The rotatable camera mount assembly according to claim 1, wherein the at least one camera attachment feature is configured such that a field of view of the at least one recording device is positioned in a direction opposite the direction of the airflow.

4. The rotatable camera mount assembly according to claim 1, wherein the body defines two camera attachment features and is capable of being engaged with two recording devices.

5. The rotatable camera mount assembly according to claim 4, wherein a first of the two camera attachment features is configured such that a field of view of the first recording device is positioned in a direction at least substantially opposite the direction of the airflow and a second of the two camera attachment features is configured such that a field of view of the second recording device is positioned in a direction at least substantially with the direction of the airflow.

6. The rotatable camera mount assembly according to claim 1 further comprising a spring mechanism mounted with respect to the shaft between the body and the body attachment component.

7. The rotatable camera mount assembly according to claim 6, wherein the body and the body attachment component are capable of at least partially compressing the spring mechanism.

8. The rotatable camera mount assembly according to claim 1, wherein the flag is fabricated from a single piece of material and curved over the pole to define the two angled portions.

9. A rotatable camera mount assembly for positioning at least one recording device on a vehicle capable of moving in at least a first direction, the rotatable camera mount assembly comprising:
   a. a body defining a first surface, a second surface, and at least one sidewall extending therebetween, the body defining a through-hole extending from the first surface to the second surface of the body;
   b. a body attachment component, wherein the body attachment component defines a first surface, a second surface and at least one sidewall extending therebetween, the body attachment component defining a through-hole extending from the first surface to the second surface of the body attachment component,
      wherein the body attachment component is mounted to the second surface of the body with a fastener that extends through the through-hole of the body from the first surface of the body and through the through-hole of the body attachment component to the second surface of the body attachment component and is secured with a fastener engagement component, wherein the fastener defines an axis of rotation extending between the body and the body attachment component, wherein the body is capable of rotating with respect to the body attachment component,
      wherein the body attachment component comprises a base mount attachment feature on the at least one sidewall for coupling the body attachment component to a base mount assembly; and
   d. a wind vane assembly including a pole and a flag, wherein the pole defines a first end and a second end, wherein the first end of the pole is mounted with respect to the first surface of the body and the pole extends in a direction opposite the second surface of the body; the pole is angled in a direction opposite the axis of rotation, such that the second end of the pole is further from the axis of rotation than the first end of the pole, wherein the pole defines a fixed angle range between about 105 degrees and 115 degrees relative to the axis of rotation; and wherein the flag is fixedly mounted in close proximity with respect to the second end of the pole; the flag defines two angled portions tangentially positioned relative to the pole, wherein the two angled portions of the flag define an internal angle range between about 25 degrees and about 35 degrees; and wherein the body defines two camera attachment features and is capable of engaging with two recording devices; wherein a first of the two camera attachment features is configured such that a field of view of the first recording device is positioned in a direction at least substantially opposite the direction of the airflow and a second of the two camera attachment features is configured such that a field of view of the second recording device is positioned in a direction at least substantially with the direction of the airflow wherein the body and the wind vane assembly are capable of being rotated in a direction of airflow traveling across the body and the wind vane assembly;

wherein when the rotatable camera mount assembly comprising the at least one camera attachment feature engaged with the at least one recording device is mounted on the vehicle and the vehicle travels in a direction of travel, the rotatable camera mount rotates to capture images/video in the direction the vehicle is traveling.

\* \* \* \* \*